(12) United States Patent
Tormey et al.

(10) Patent No.: US 8,460,028 B2
(45) Date of Patent: *Jun. 11, 2013

(54) SELF POWERED ELECTRIC VEHICLE CHARGING CONNECTOR LOCKING SYSTEM

(75) Inventors: Milton T. Tormey, Los Altos, CA (US); Craig T. Matsuno, San Jose, CA (US); Carl F. Hagenmaier, Jr., Los Altos, CA (US); David Baxter, Monte Sereno, CA (US)

(73) Assignee: Chargepoint, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,744

(22) Filed: Sep. 27, 2011

(65) Prior Publication Data

US 2012/0135626 A1 May 31, 2012

Related U.S. Application Data

(63) Continuation of application No. 12/764,845, filed on Apr. 21, 2010, now Pat. No. 8,025,526.

(51) Int. Cl.
*H01R 13/66* (2006.01)
(52) U.S. Cl.
USPC .......................................................... 439/528
(58) Field of Classification Search
USPC ................... 439/34, 133, 135, 148, 304, 347, 439/372, 528; 320/107, 108, 109, 111
See application file for complete search history.

(56) References Cited

U.S. PATENT DOCUMENTS

| 5,202,617 | A | 4/1993 | Nor |
| 5,306,999 | A | 4/1994 | Hoffman |
| 5,478,250 | A | 12/1995 | Hoffman |
| 7,804,274 | B2 | 9/2010 | Baxter et al. |
| 8,025,526 | B1 * | 9/2011 | Tormey et al. ................ 439/528 |
| 2003/0120442 | A1 | 6/2003 | Pellegrino et al. |

OTHER PUBLICATIONS

PCT Search Report and Written Opinion for PCT/US11/33327, mailed Nov. 20, 2012, 7 pages.

* cited by examiner

*Primary Examiner* — Khiem Nguyen
(74) *Attorney, Agent, or Firm* — Blakely, Sokoloff, Taylor & Zafman LLP

(57) ABSTRACT

A self powered electric vehicle charging connector locking system for locking and unlocking a charging connector of an electric vehicle charging cord includes an electric vehicle charging station and an electric vehicle charging connector locking holster. The charging station includes an electricity control device to energize and de-energize the charging cord to control a supply of electricity available to flow through the charging cord. Current does not flow through the charging cord when it is de-energized and some amount of current is capable of flowing through the charging cord when it is energized. The locking holster includes a charging connector locking holster inlet to receive the charging connector of the charging cord and a locking unit to lock the charging connector in the locking holster when it is inserted into the locking holster inlet and unlock the charging connector from the locking holster responsive to the charging cord becoming energized.

20 Claims, 14 Drawing Sheets

SELF POWERED ELECTRIC VEHICLE CHARGING CONNECTOR LOCKING SYSTEM

CROSS-REFERENCE TO RELATED APPLICATIONS

This application is a continuation of application Ser. No. 12/764,845, filed Apr. 21, 2010, which is hereby incorporated by reference.

BACKGROUND

1. Field

Embodiments of the invention relate to the field of charging stations for electric vehicles; and more specifically, to a self powered electric vehicle charging connector locking system.

2. Background

Electric vehicle charging stations are used to deliver energy to electric vehicles for charging. These charging stations may be located in publicly accessible locations and may include attached charging cords where one end is terminated at the charging station (and securely retained within the charging station) and the other end terminates in a connector (such as a connector conforming to the SAE Electric Vehicle and Plug in Hybrid Electric Vehicle Conductive Charge Coupler standard, document number J1772, published January 2010 ("SAE J1772 standard")). Typically the charging cord connector is not secured when the charging station is not in use, which allows the charging cord to be used in an inappropriate manner and can damage the cord and/or connector. For example, the charging cord may be subject to being used as a jump rope, may be wrapped around objects, etc.

Some charging connectors (e.g., connectors conforming to the SAE J1772 standard) are designed to be locked in an electric vehicle charging inlet during electric vehicle charging such that the connector cannot be removed while the vehicle is charging. The locking mechanism that locks these charging connectors is controlled by the electric vehicle, and is typically tied to the car door locking system.

SUMMARY

A self powered electric vehicle charging connector locking system for locking and unlocking a charging connector of an electric vehicle charging cord is described. In one embodiment, an electric vehicle charging cord is fixably attached to a charging station where one end is secured at the charging station and the other end terminates in a charging connector that plugs into electric vehicles (for charging) and plugs into an electric vehicle charging connector locking holster (e.g., when not in use). The charging station controls the supply of electricity available to flow through the charging cord by energizing and de-energizing the charging cord. Current does not flow through the charging cord when it is de-energized while some amount of current is capable of flowing through the charging cord when it is energized. The electric vehicle charging connector locking holster locks the charging connector when it is plugged into the locking holster. The locking mechanism does not require electrical power to maintain the lock. Thus, if power is lost, the charging connector remains locked in the locking holster. The locking holster unlocks the charging connector responsive to the charging cord being energized. Thus, the unlocking mechanism of the locking holster leverages the power supplied through the charging cord itself, which eliminates the need for additional or dedicated wiring for the unlocking mechanism of the locking holster.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
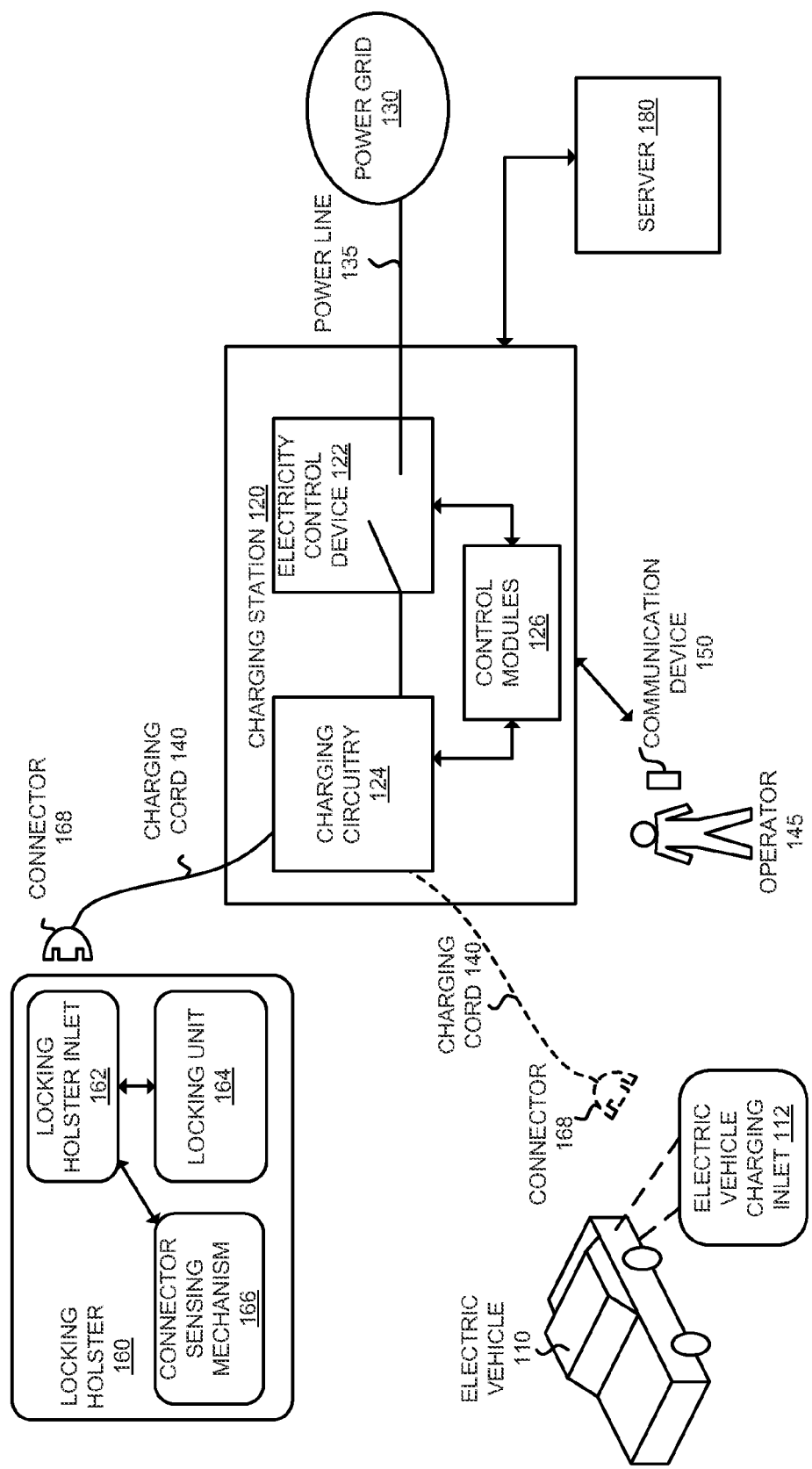
FIG. 1 illustrates an exemplary self powered electric vehicle charging connector locking system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A self powered electric vehicle charging connector locking system is described. In one embodiment of the invention, the self powered electric vehicle charging connector locking system includes an electric vehicle charging station for charging electric vehicles (hereinafter "charging station") and an electric vehicle charging connector locking holster (hereinafter "locking holster"). An electric vehicle charging cord (hereinafter "charging cord") is fixably attached to the charging station, where one end is secured at the charging station while the other end terminates with a charging connector (e.g., an SAE J1772 compliant connector) that plugs into an electric vehicle (to charge the electric vehicle) and plugs into the locking holster (when not in use). The charging station further includes an electricity control device to energize and de-energize the charging cord to allow or prevent a supply of electricity to flow through the charging cord. Current does not flow from the charging station through the charging cord when it is de-energized while some amount of current is capable of flowing from the charging station through the charging cord when it is energized. The charging station energizes the charging cord to allow an electric vehicle to be charged and energizes the charging cord to unlock it from the locking holster.

The locking holster, which may be attached to the charging station or located remotely from the charging station, includes a charging connector locking holster inlet (hereinafter "locking holster inlet") to receive the charging connector of the charging cord. The charging connector includes contacts that mate with corresponding components of the locking holster inlet that establishes an electrical connection between the charging station and the locking holster. The locking holster includes a locking unit coupled to the locking holster inlet to lock the charging cord upon insertion in the locking holster such that electricity is not drawn while maintaining the lock (thus the charging cord will remain locked in the locking holster if power is lost).

The locking unit includes an electrical unlocking mechanism, which is powered through application of power through the charging cord. In other words, the locking unit unlocks the charging cord responsive to the charging cord being energized. Thus, the unlocking mechanism of the locking holster leverages the power supplied through the charging cord itself, which eliminates the need for additional or dedicated wiring for the unlocking mechanism of the locking holster. In one embodiment, the charging station energizes the charging cord to unlock it after receiving a request to use the charging station, and in some embodiments, after an authorization procedure is performed.

The locking holster further includes a mechanism to indicate to the charging station that its charging cord is plugged into the locking holster (e.g., as opposed to being plugged into an electric vehicle charging inlet of an electric vehicle). The charging station detects when the charging cord is removed from the locking holster and de-energizes the charging cord. Responsive to detecting that the charging cord is plugged into an electric vehicle, the charging station energizes the charging cord to allow charging to commence.

FIG. 1 illustrates an exemplary self powered electric vehicle charging connector locking system according to one embodiment. As illustrated in FIG. 1, the charging station 120, which is coupled with the power grid 130 over the power line 135, charges electric vehicles (e.g., electric battery powered vehicles, gasoline/electric battery powered hybrid vehicles, etc.) such as the electric vehicle 110. Thus, electricity storage devices (e.g., batteries, supercapacitors, etc.) of electric vehicles may be charged through use of the charging station 120. The power grid 130 can be owned and/or operated by local utility companies or owned and/or operated by private persons/companies, and supplies the electricity for the charging station 120.

The charging cord 140 is fixably attached to the charging station 120, where one end is secured at the charging station and the other end (e.g., the end terminating with the charging connector 168) plugs into an electric vehicle charging inlet of an electric vehicle, such as the electric vehicle charging inlet 112 of the electric vehicle 110, or plugs into the locking holster inlet 162 of the locking holster 160. In one embodiment, the charging connector 168 conforms to the SAE J1772 standard and the locking holster inlet 162 is designed to receive an SAE J1772 compliant connector, and the electric vehicle charging inlet 112 conforms to the SAE J1772 standard and is designed for an SAE J1772 compliant connector. The charging cord 140 is coupled with the charging circuitry 124, which provides the circuitry for electrical connections for the charging cord 140. Operators of electric vehicles (e.g., drivers of electric vehicles, passengers of electric vehicles, service personnel of electric vehicles, etc.), such as the electric vehicle operator 145, connect the charging connector 168 into an electric vehicle charging inlet of their electric vehicle(s), such as the electric vehicle charging inlet 112 of the electric vehicle 110, to charge their electric vehicle(s). When not in use, the charging cord 140 may be plugged into the locking holster inlet 162 of the locking holster 160. As will be described in greater detail later herein, the locking unit 164 of the locking holster 160 locks and unlocks the charging cord 140. Thus while locked in the locking holster 160, the cord 140 is protected from being used in an inappropriate manner (e.g., jumping rope with the cord, wrapping the cord around objects, etc.).

The charging station 120 energizes and de-energizes the charging cord 140 to allow or prevent a supply of electricity to flow from the charging station 120 through the charging cord 140 respectively. For example, the charging station 120 includes an electricity control device 122 that energizes or de-energizes the charging cord 140 through the charging circuitry 124 (e.g., by completing the connection of the power line 135 with the charging circuitry 124). In one embodiment, the electricity control device 122 is a solid-state device that is controlled by the control modules 126, which include a set of one or more modules (e.g., hardware, firmware, software, or a combination thereof), or any other device suitable for controlling the flow of electricity (e.g., Pulse Width Modulation (PWM) circuitry, switch, relay, etc.). In some embodiments, the electricity control device 122 energizes or de-energizes the charging cord 140 responsive to instructions received from the control modules 126. For example, in some embodiments, the control modules 126 instruct the electricity control device 122 to energize the charging cord 140 after determining that an electric vehicle operator or an electric vehicle is authorized to use the charging station 120. As will be described in greater detail later herein, the control modules 126 also instruct the electricity control device 122 to energize the charging cord 140 to cause the locking holster 160 to unlock the charging cord 140 from the locking holster 160.

The locking holster 160 may be physically attached to the charging station 120 or located remotely from the charging station 120. The locking holster 160 includes the locking holster inlet 162 to receive the charging connector 168 of the charging cord 140 (or other like charging plugs from different charging stations). The locking holster inlet 162 is coupled with the locking unit 164, which locks and unlocks the charging connector 168 from the locking holster 160. The locking unit 164 is adapted to lock the charging cord 140 responsive to it being plugged into the locking holster inlet 162. For example, the locking unit 162 includes a mechanical latch that locks the connector 168 in the locking holster inlet 162 when inserted. Power is not required to maintain the lock. It should be understood that the charging cord 140 cannot be unplugged from the locking holster 160 while it is locked. The locking unit 164 is also adapted to unlock the connector 158 from the locking holster inlet 162 responsive to the charging cord 140 being energized.

The locking holster 160 also includes a connector sensing mechanism 166 which is used to indicate to the charging station 120 (or other charging stations that have a charging cord plugged into the locking holster) when the charging cord 140 is plugged into the locking holster inlet 162. The signal from the connector sensing mechanism 166 allows the charging station 120 to distinguish between the charging cord 140 being plugged into the locking holster inlet 162 and being plugged into a vehicle In one embodiment, the connector sensing mechanism 166 produces a control pilot signal of a certain voltage to indicate when the charging cord 140 is plugged into the locking holster inlet 162 (the voltage of the control pilot signal is different when the charging cord 140 is plugged in the electric vehicle charging inlet 112). For example, in one embodiment, a diode of the connector sensing mechanism 166 on the control pilot signal line is reversed (as compared with a diode on the control pilot signal line of the onboard charging electronics of the electric vehicle) such that the control pilot signal returns negative voltage (e.g., negative 12 volts) when the charging cord 140 is plugged into the locking holster inlet 162 (in this embodiment the control pilot signal would have positive voltage (e.g., three, six, or, nine volts) when the charging cord 140 is plugged into the electric vehicle charging inlet 112). As another example, in one embodiment, a resistor to ground in the connector sensing mechanism 166 is reduced such that the voltage of the control pilot signal line is different when the charging cord 140 is plugged into the locking holster inlet 162 as compared to when the charging cord 140 is plugged into the electric vehicle charging inlet 112 (e.g., two volts when plugged into the locking holster inlet 162 compared with three, six, or nine volts when plugged into the electric vehicle charging inlet 112).

The charging station 120 senses when the charging cord 140 has been unplugged from the locking holster 160. Responsive to sensing that the charging cord 140 has been removed from the locking holster 160, the charging station 120 de-energizes the charging cord 140 to prevent electricity from flowing from the power grid 130 through the charging cord 140. After sensing that the charging cord 140 has been plugged into the electric vehicle charging inlet 112 of the electric vehicle 110, the charging station 120 energizes the charging cord 140 to allow electricity to flow from the power grid 130 through the charging cord 140 to allow the electric vehicle 110 to charge.

Electric vehicle operators request charging service from the charging station (either directly or indirectly through a remote payment station or other device). For example, the operator 145 may use the communication device 150 to initiate and request charging service for the electric vehicle 110. The communication device 150 may be a WLAN or WPAN device (e.g., one or two-way radio-frequency identification (RFID) device, mobile computing device (e.g., laptops, palmtop, smartphone, multimedia mobile phone, cellular phone, etc.)), ZigBee device, etc. The communication device 150 communicates one or more access identifiers (e.g., an identifier (or a portion of an identifier) associated with the electric vehicle operator (e.g., an RFID tag associated with the electric vehicle operator, a username/password, an email address, a phone number, a street address, a credit card number, account number, PIN (personal identification number) etc.) or the electric vehicle (e.g., a VIN (vehicle identification number))) and/or payment credentials to the charging station. It should be understood that use of the communication device 150 to initiate and request charging service is exemplary; and other ways to initiate and request charging service may be used in some embodiments (e.g., the electric vehicle operator requests charging service through a user interface of the charging station, etc.).

It should be understood that the operator 145 may request charging service from the charging station 120 differently in some embodiments of the invention. For example, the operator 145 may interact with a payment station coupled with the charging station 120, which may then send appropriate instructions to the charging station 120 regarding the charging of the vehicle 110. The payment station may function similarly to a payment station for a parking space. In addition, a payment station coupled with the charging station 120 may be used both for parking payment and charging payment.

In some embodiments, after receiving the request for charging service, a determination is made whether the electric vehicle operator 145 is authorized to use the charging station 120. In one embodiment, the charging station 120 locally determines whether the operator 145 is authorized (e.g., by checking whether the operator 145 is represented on a list of authorized users stored in the charging station 120). In another embodiment of the invention, the charging station 120 may transmit an authorization request that includes the information read from the communication device 150 to the charging station network server 180 for authorization. In another embodiment of the invention, the server 180 receives the request directly from the operator 145 determines whether the operator 145 is authorized to use the charging station 120. It should be understood that the charging station 120 may communicate with the server 180 indirectly through one or more other devices (e.g., a gateway device). For example, in some embodiments, the charging station 120 communicates with the server 180 indirectly through a gateway device (which may be part of a different charging station) that relays messages and data between the charging station 120 and the server 180. Of course it should be understood that in some embodiments an authorization procedure is not performed as a requirement to use the charging station.

After receiving the request to use the charging station (and after successfully authorizing the operator 145 if necessary), and assuming that the charging connector 168 is locked within the locking holster 160, the charging station 120 energizes the charging cord 140 to cause the locking unit 164 to unlock the charging connector 168 from the locking holster inlet 162. Once unlocked, the electric vehicle operator 145 may remove the charging cord 140 from the locking holster 160.

As described above, responsive to the charging station 120 sensing that the charging connector 168 has been unplugged from the locking holster inlet 162, the charging station 120 de-energizes the charging cord 140 to prevent electricity from flowing from the power grid 130 through the charging cord 140. Responsive to detecting that the charging connector 168 has been connected to the electric vehicle charging inlet 112 of the electric vehicle 110, the charging station 120 energizes the charging cord 140 to allow electricity to flow from the power grid 130 to the electric vehicle 110.

Figure 2:
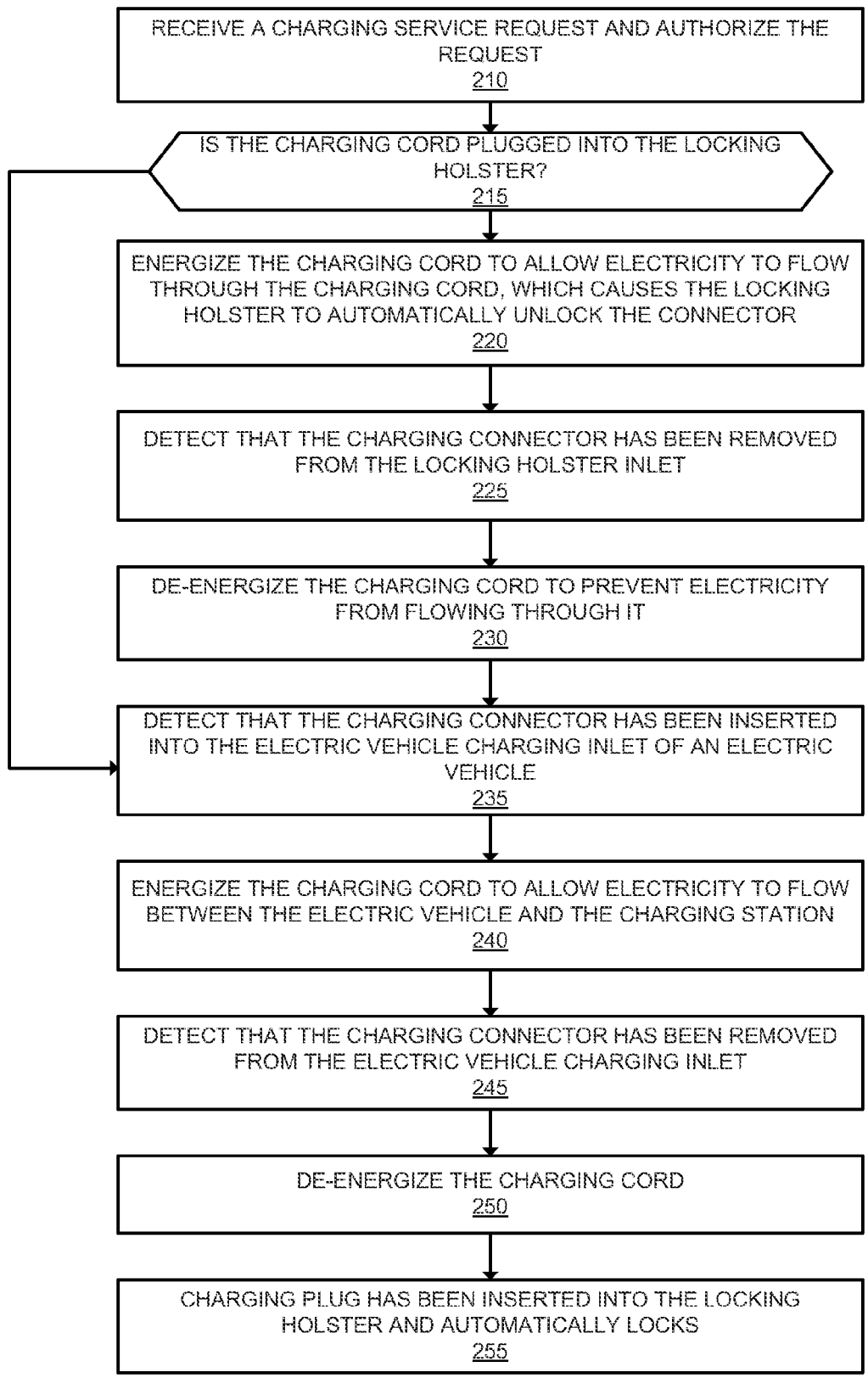
FIG. 2 is a flow diagram illustrating exemplary operations for a self powered electric vehicle charging connector locking system according to one embodiment.

FIG. 2 is a flow diagram illustrating exemplary operations for a self powered electric vehicle charging connector locking system according to one embodiment. FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2.

At block 210, the charging station 120 receives a request for charging service from the electric vehicle operator 145 and authorizes the request (determines that the electric vehicle operator 145 is allowed to use the charging station). The authorization may include transmitting a corresponding authorization request to the server 180. Control flows from block 210 to block 215.

At block 215 the charging station 120 determines if the charging cord 140 is plugged into the locking holster 160 (and which the charging connector 168 is presumably locked by the locking unit 164 in the locking holster inlet 162). In one embodiment, the control modules 126 of the charging station 120 analyze the voltage of the pilot signal returning from the locking holster 126. If the pilot signal is negative, then the charging connector 168 is plugged into the locking holster inlet 162 of the locking holster 160. However, if the pilot signal is positive, then the charging cord 140 is not plugged into the locking holster 160. If the charging cord is plugged into the locking holster, then flow moves to block 220, otherwise flow moves to block 235.

At block 220, the charging station 120 energizes the charging cord 140 to allow electricity to flow through the charging cord, which causes the locking unit 164 of the locking holster 160 to automatically unlock the charging connector 168 from the locking holster inlet 162. In one embodiment, the same mechanism for energizing the charging cord 140 to allow for electric vehicle charging is used to energize the charging cord 140 to unlock it from the locking holster 160. For example, with reference to FIG. 1, the electricity control device 122 energizes the charging 140 in the same way when energizing it for electric vehicle charging and to unlock it from the locking holster 160. After the charging connector 168 is unlocked from the locking holster inlet 162, it may be removed (e.g., by the electric vehicle operator 145). It should be understood that using the power controls that energize the charging cord, as well as delivering the power for the unlocking mechanism of the locking holster through the charging cord itself, eliminates the need for additional or dedicated wiring to control unlocking of the charging cord. Thus, the power to unlock the charging cord is supplied through the charging cord itself.

Flow then moves to block 225 where the charging station 120 detects that the charging connector 168 has been removed from the locking holster inlet 162. For example, the control modules 126 of the charging station analyze the voltage of the pilot signal. When the voltage becomes positive, then the charging connector 168 has been removed from the locking holster inlet 162. Flow moves from block 225 to block 230.

At block 230, the charging station 120 de-energizes the charging cord 140 to prevent electricity from flowing from the power grid 130 through the charging cord 140. Flow then moves to block 235, where the charging station 120 detects that the charging connector 168 has been inserted into the electric vehicle charging inlet 112 of an electric vehicle (e.g., the electric vehicle 110). For example, the control modules 126 of the charging station 120 analyze the voltage of the pilot signal. When it reaches a certain voltage (e.g., three to six volts), the charging station 120 determines that the charging connector has been inserted into an electric vehicle and that it is ready to accept a charge. Flow then moves to block 240.

At block 240, the charging station 120 energizes the charging cord 140 to allow electricity to flow from the power grid 130 to the electric vehicle 110, thereby allowing the electric vehicle 110 to be charged. In some embodiments, prior to energizing the charging cord 140, the series of control messages are exchanged between the charging station 120 and the electric vehicle 110 (e.g., the charging station 120 indicates that it is ready to supply energy, the electric vehicle 110 indicates that it is ready to accept energy, the charging station 120 communicates its maximum available current capacity to the electric vehicle 110, etc.). Flow moves from block 240 to block 245.

At block 245, the charging station 120 detects that the charging connector 168 has been removed from the electric vehicle 110. For example, the control modules 125 analyze the voltage of the pilot signal. When the voltage becomes zero, then the charging connector 168 has been removed from the electric vehicle charging inlet 112 of the electric vehicle 110. Flow then moves to block 250, where the charging station 120 de-energizes the charging cord 140. Flow then moves to block 255, where the charging connector 168 has been plugged into the locking holster inlet 162 and is automatically locked by the locking unit 164.

Figure 3:
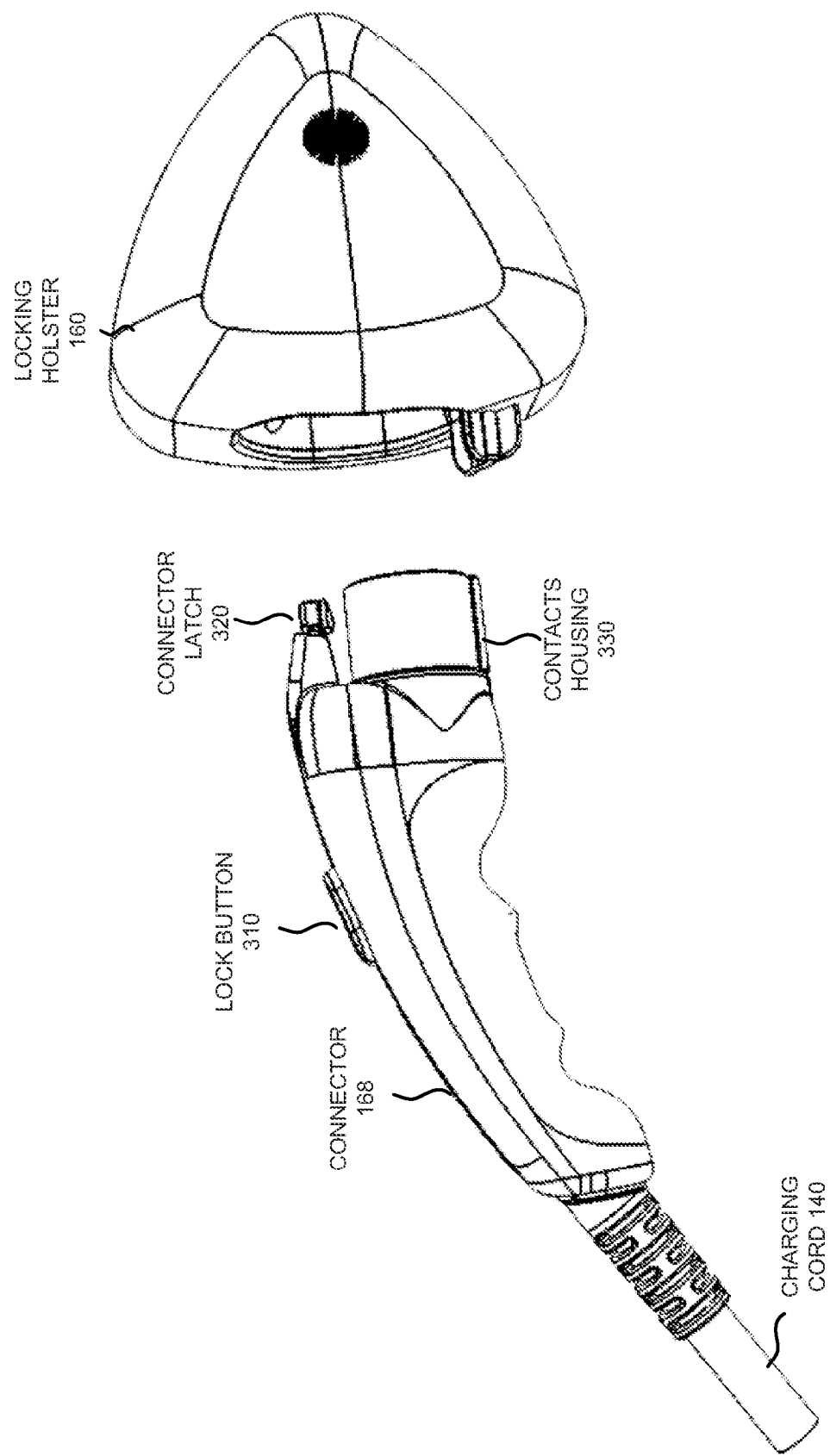
FIG. 3 illustrates an exemplary charging connector and an exemplary locking holster according to one embodiment of the invention.
Figure 4:
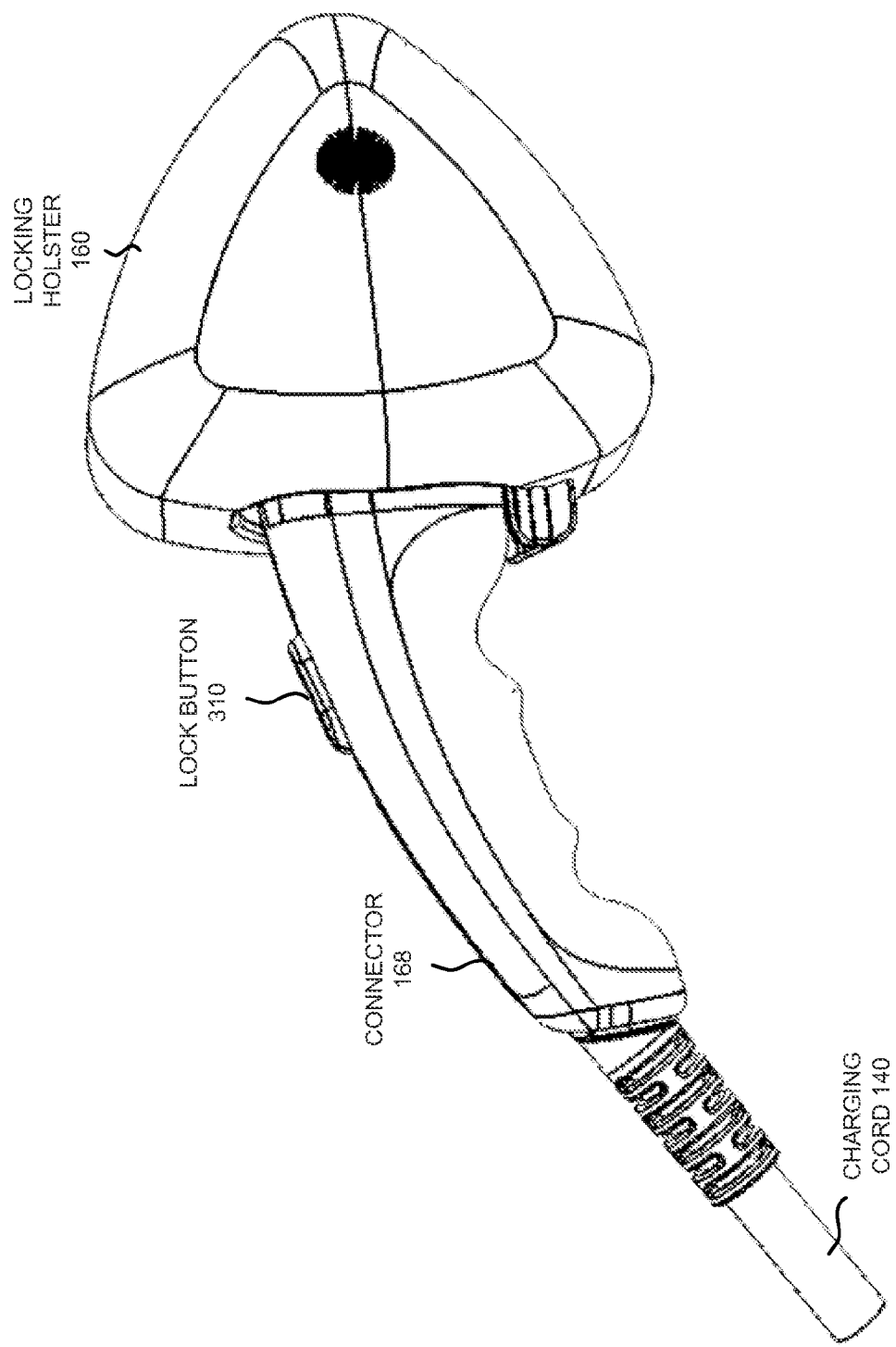
FIG. 4 illustrates the exemplary charging connector plugged into the exemplary locking holster according to one embodiment of the invention.

FIG. 3 illustrates an exemplary charging connector and an exemplary locking holster according to one embodiment of the invention. As illustrated in FIG. 3, the charging connector 168 includes the lock button 310, the connector latch 320, and the contacts housing 330. As will be described in greater detail later herein, the connector latch 320 used in combination with a latch of the locking holster 160 allows the connector 168 to lock and unlock within the locking holster 160. The lock button 310 controls the connector latch 320 to latch and unlatch the connector latch 320. It should also be understood that the lock button 310 and the connector latch 320 may be used to latch and unlatch the connector 168 to electric vehicle charging inlets of electric vehicles. In one embodiment, the charging connector 168 conforms to the SAE J1772 standard. FIG. 4 illustrates the charging connector 168 plugged into the locking holster 160 according to one embodiment of the invention.

Figure 5:
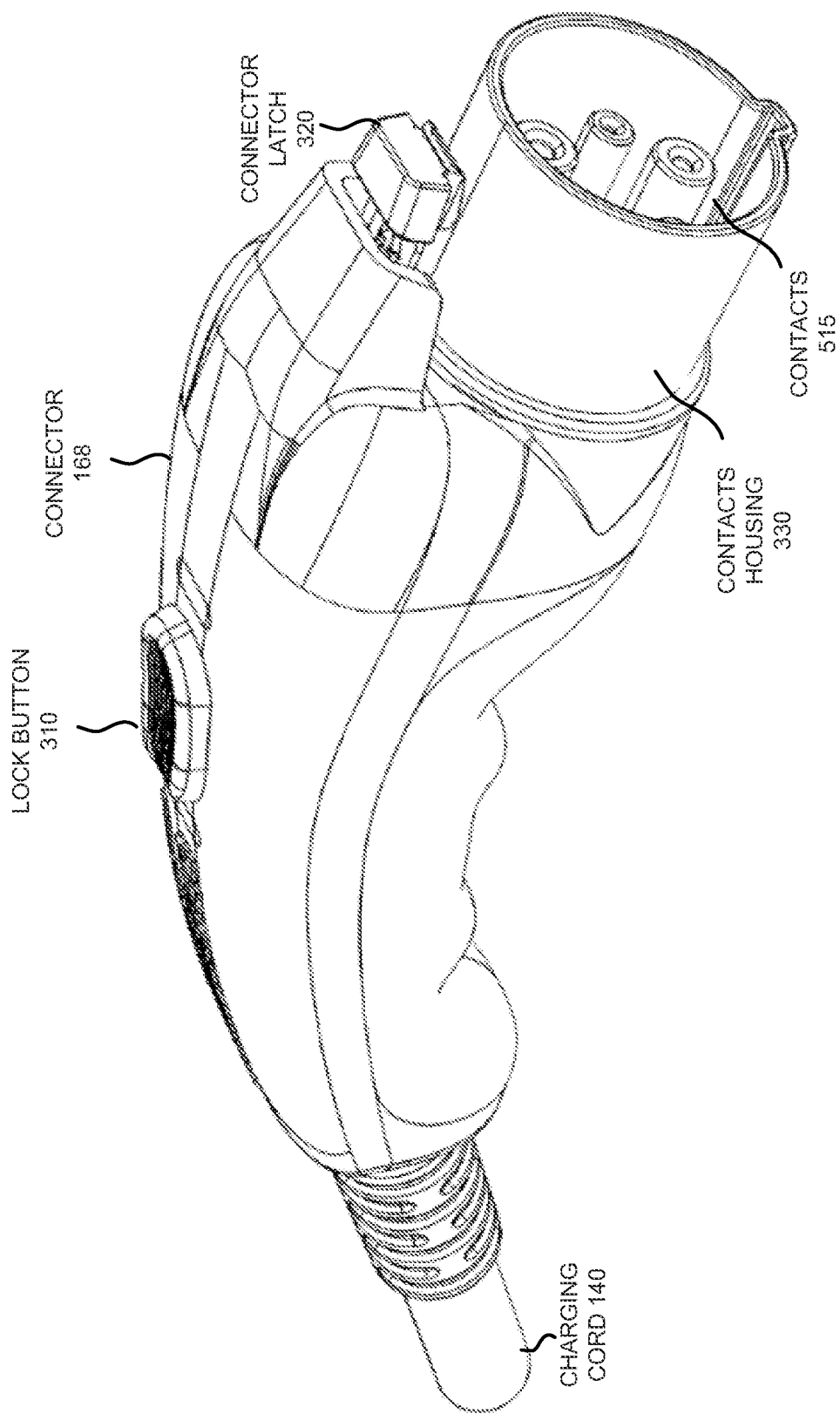
FIG. 5 illustrates the exemplary charging connector of FIG. 3 according to one embodiment of the invention
Figure 6:
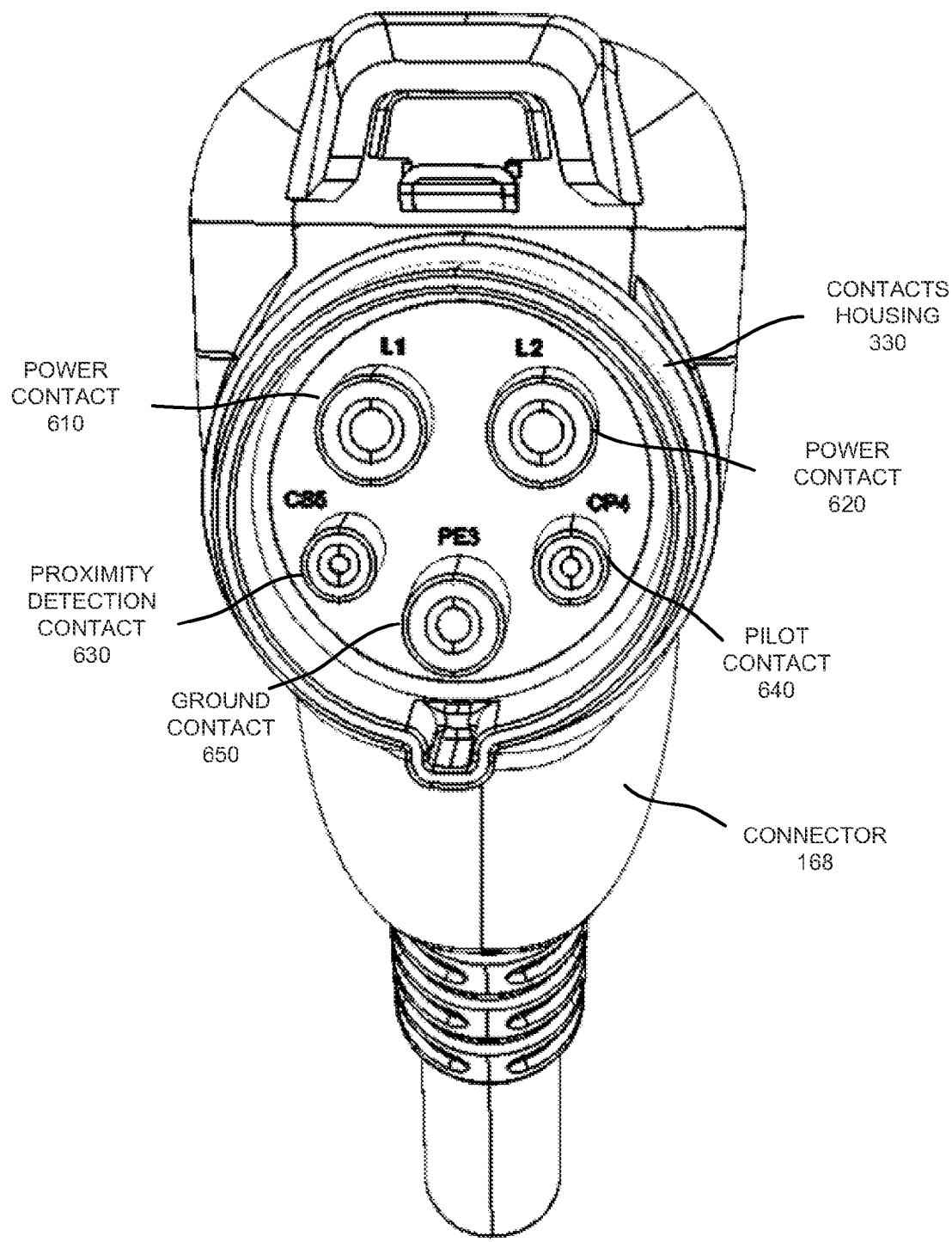
FIG. 6 illustrates the front of the exemplary charging connector of FIG. 3 according to one embodiment of the invention.

FIG. 5 illustrates the exemplary charging connector of FIG. 3 according to one embodiment of the invention. As illustrated in FIG. 5, the contacts housing 330 includes multiple contacts 515, which are illustrated in more detail in FIG. 6. The contacts 515 mate with corresponding conductive components (e.g., pins) of the locking holster inlet of the locking holster 160. FIG. 6 illustrates the front of the exemplary charging connector of FIG. 3 according to one embodiment of the invention. As illustrated in FIG. 6, the contacts 515 include the power contact 610, the power contact 620, the proximity detection contact 630, the pilot contact 640, and the ground contact 650. The power contact 610 is used for level one charging (charging electric vehicles using standard electrical locking holster inlets and plugs such as NEMA (National Electrical Manufacturers Association) standards 5-15, 5-20, 14-50 or other standards (e.g., BS 1363, CEE7, etc), typically at 120 volts with a maximum amperage of 12-16). The power contact 620 is used for level two charging (charging electric vehicles using dedicated supply equipment and typically operates at 208 to 240 volts with a maximum amperage of 80). The charging station 120 may provide level one and/or level two charging. As will be described in greater detail later herein, to unlock the connector 168 from the locking holster 160, the charging station 120 energizes the charging cord 140 causing electricity to flow through the power contacts 610 and 620, which will cause the locking unit 164 of the locking holster 160 to unlock the connector 168.

The proximity detection contact 630 is used by an electric vehicle to detect the presence of the connector 168 in its electric vehicle charging inlet. Proximity detection may be tied to a drive interlock system on the electric vehicle to prevent the electric vehicle from being started while the connector 168 is plugged in the electric vehicle. In one embodiment, the proximity detection contact 630 is not used by the locking holster 160.

The ground contact 650 is a grounding conductor between the charging station 120 and the locking holster 160 (when plugged in the locking holster 160) and between the charging station 120 and an electric vehicle (when plugged into the electric vehicle charging inlet of that electric vehicle). The ground contact 650 provides a return path for the control pilot.

The pilot contact 640 is used to carry a control pilot signal from the charging station 120. The pilot signal, among other things, is used to sense when the connector 168 is plugged into the locking holster inlet 162 of the locking holster 160, and sense when the connector 168 is plugged into the electric vehicle charging inlet of an electric vehicle. The pilot signal may also be used to determine whether an electric vehicle is ready to accept energy, to communicate the charging station's maximum available current capacity, determine whether indoor ventilation is required, and verify the grounding circuitry. In one embodiment, the charging station 120 measures the voltage of the return path of the pilot signal to sense when the connector 168 is plugged into the locking holster inlet 162 and when it is plugged into the electric vehicle charging inlet of an electric vehicle. For example, in some embodiments the voltage of the return path of the pilot signal is negative when the connector 168 is plugged into the locking holster inlet 162 and is the voltage is positive (typically between three and nine volts) when the connector 168 is plugged into the electric vehicle charging inlet of an electric vehicle. In other embodiments, the voltage of the return path of the pilot signal when the connector 168 is plugged into the locking holster inlet 162 is a different positive value (e.g., two volts) than when the connector 168 is plugged into an electric vehicle charging inlet (e.g., three to nine volts).

Figure 7:
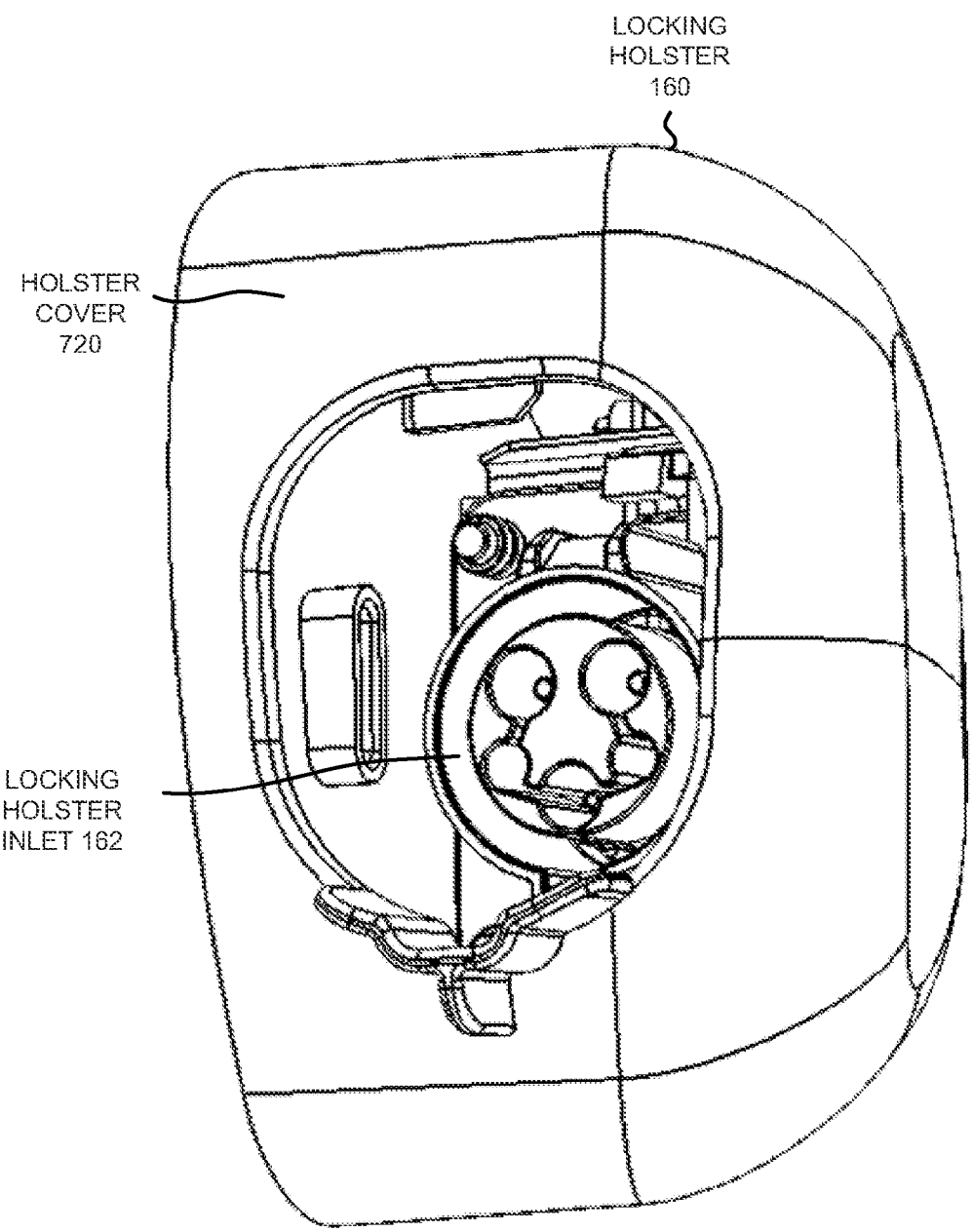
FIG. 7 illustrates the exemplary locking holster of FIG. 3 according to one embodiment of the invention.

FIG. 7 illustrates the exemplary locking holster of FIG. 3 according to one embodiment of the invention. As illustrated in FIG. 7, the locking holster 160 includes a holster cover 720 and the locking holster inlet 162. It should be understood that the shape of the locking holster as illustrated in FIG. 7 is exemplary, and other shapes may be used in embodiments. For example, the shape of the locking holster 160 may be such that it can be attached to the charging station 120; however as previously described, the locking holster 160 may be located remotely from the charging station 120.

Figure 8:
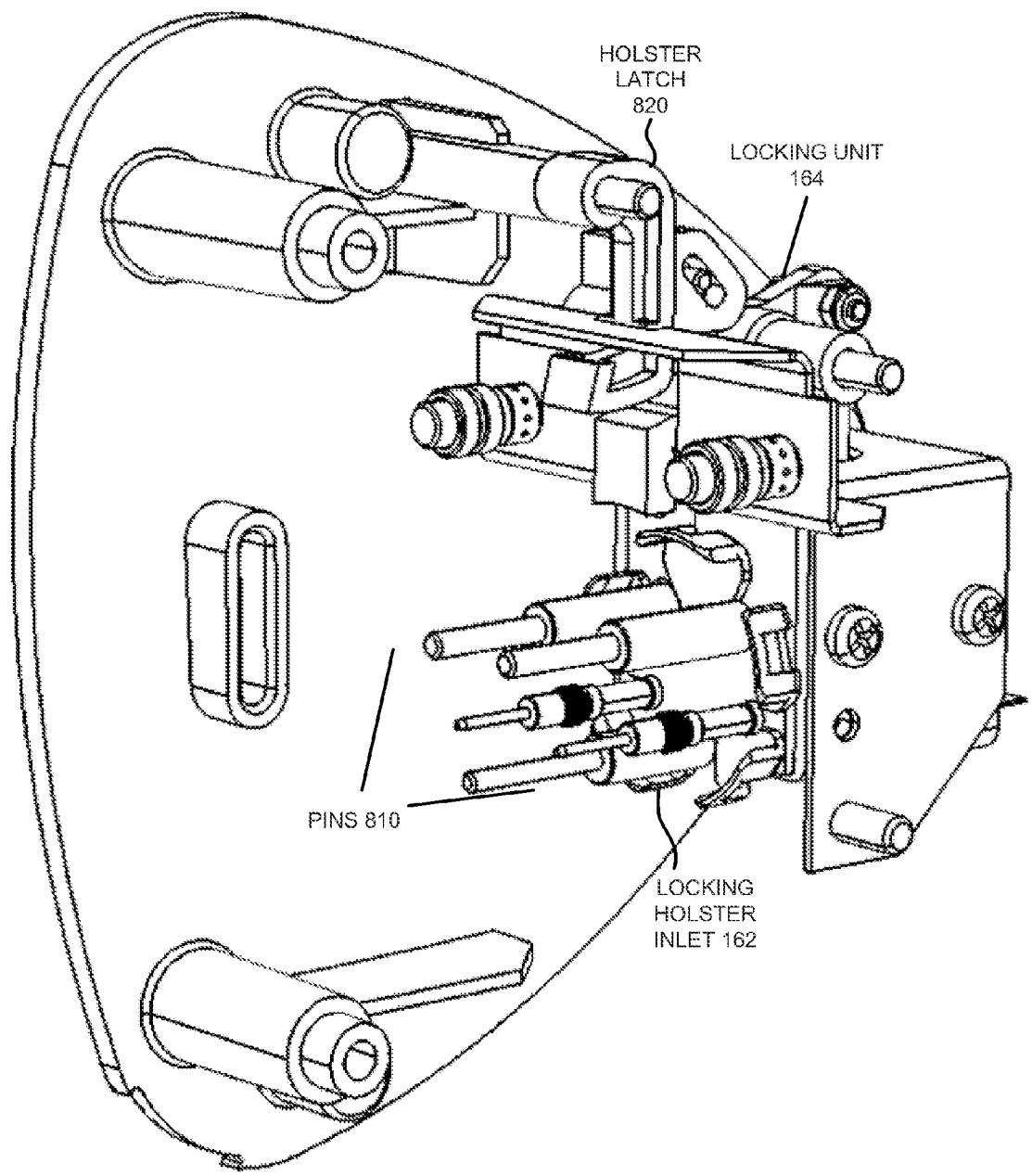
FIG. 8 illustrates an internal view of the exemplary locking holster of FIG. 7 according to one embodiment of the invention.

FIG. 8 illustrates an internal view of the exemplary locking holster of FIG. 7 where the holster cover 720 is removed according to one embodiment of the invention. As illustrated in FIG. 8, the locking holster inlet 162 includes the pins 810, which include a corresponding pin for each of the contacts 515 (two power pins corresponding to the power contacts 610 and 620, a proximity detection pin corresponding to the proximity detection contact 630, a control pilot pin corresponding to the control pilot contact 650, and a ground pin corresponding to the ground contact 650). The pins 810 mate with the contacts 515. Also illustrated in FIG. 8 is the holster latch 820 (part of the locking unit 164). The holster latch 820 locks and unlocks the charging connector 168. For example, the holster latch 820 locks the charging connector 168 when it is inserted into the locking holster inlet 162 and unlocks the charging connector 168 through movement controlled by a solenoid apparatus, whose solenoid pin movement is activated when the charging cord 140 is energized while the charging connector 168 is inserted into the locking holster inlet 162.

Figure 9:
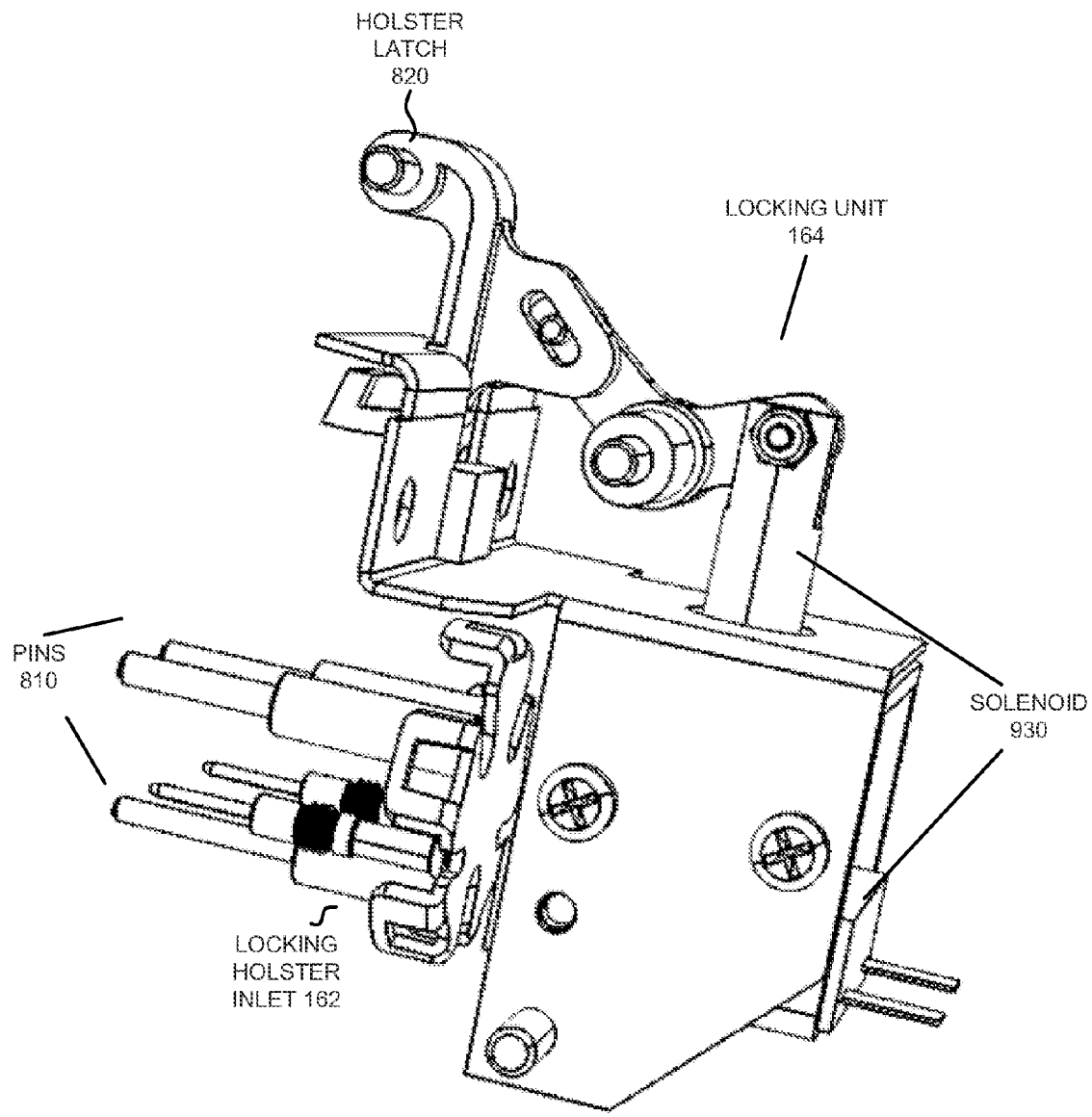
FIG. 9 illustrates an exemplary locking unit and locking holster inlet according to one embodiment of the invention.

FIG. 9 illustrates the locking unit 164 of FIG. 8 in more detail. The locking unit 164 includes the holster latch 820 and the solenoid 930, which is an AC (alternating current) solenoid. The solenoid 930 controls the movement of the holster latch 820 when energized. For example, assuming the charging connector 168 is plugged and locked into the charging locking holster inlet 162, when the charging station 120 energizes the charging cord 140, power will be supplied through the power pins of the locking holster inlet 162 to the solenoid 930 causing the holster latch 820 to unlock the charging connector 168 (e.g., the holster latch 820 releases allowing the charging connector 168 to be removed from the locking holster inlet 162).

Figure 10:
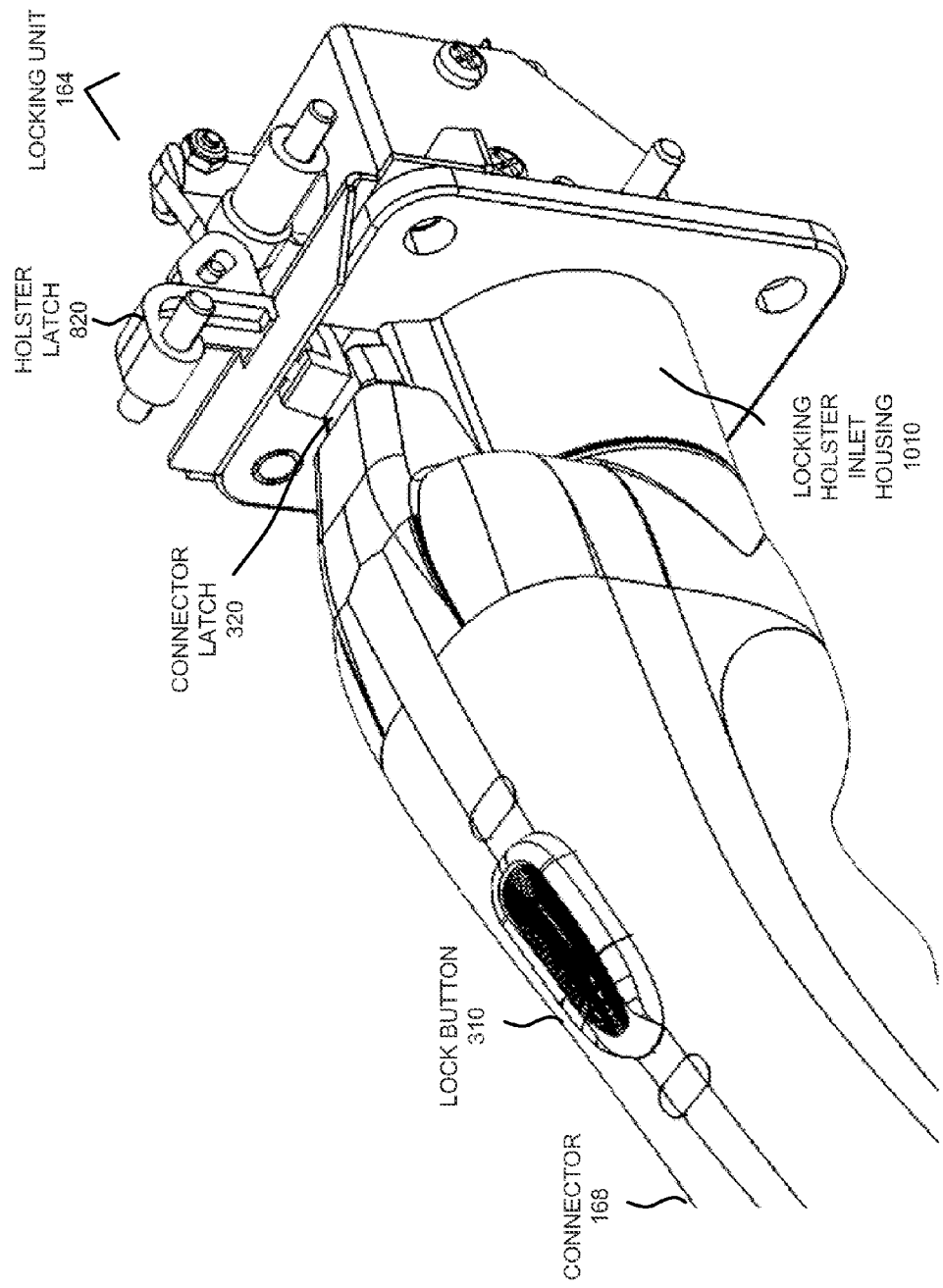
FIG. 10 illustrates the exemplary connector mated and locked with the exemplary connector locking holster inlet according to one embodiment of the invention.
Figure 11:
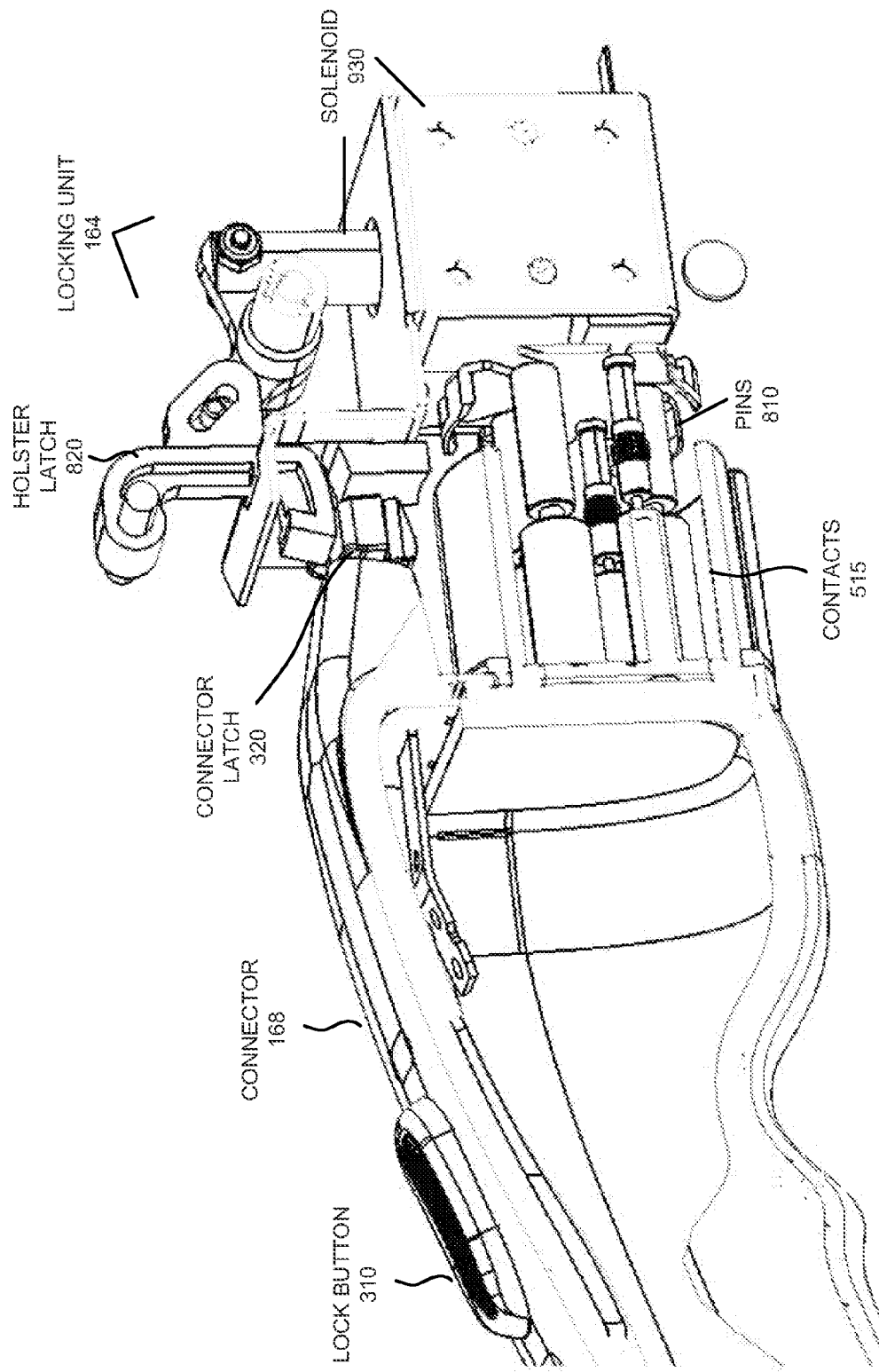
FIG. 11 illustrates a cross section view of FIG. 10 according to one embodiment of the invention.

FIG. 10 illustrates the exemplary connector 168 mated and locked to the locking holster inlet 162 according to one embodiment of the invention. FIG. 11 illustrates a cross section view of FIG. 10 according to one embodiment of the invention. As illustrated in FIGS. 10 and 11, the contacts 515 mate with the pins 810 (within the locking holster inlet housing 1010), and the connector latch 320 engages with the holster latch 820 to lock the connector 168 within the locking holster 160.

Figure 12:
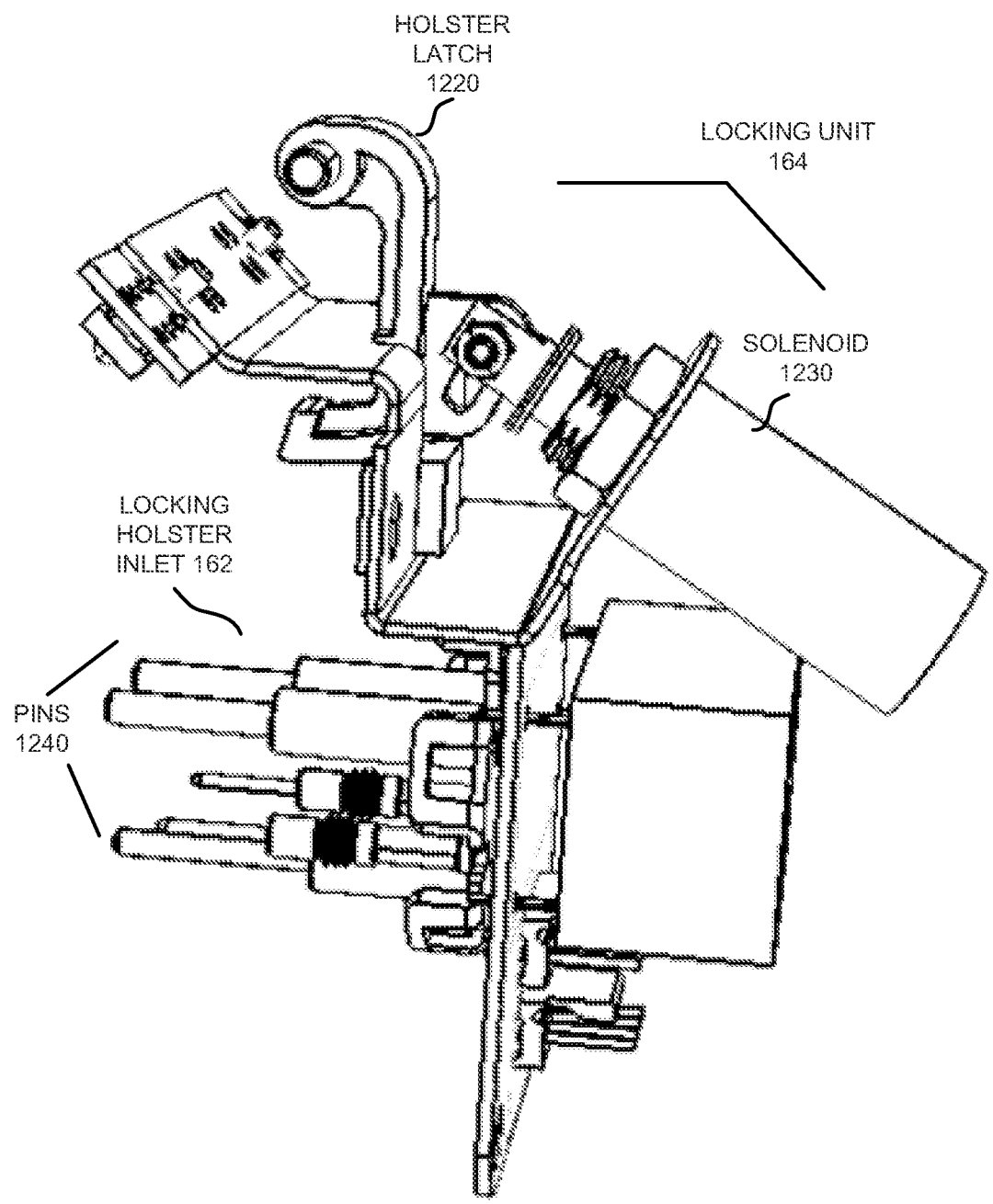
FIG. 12 illustrates an alternative exemplary locking unit and connector locking holster inlet according to one embodiment of the invention.

In some embodiments, the locking unit 164 includes a DC (direct current) solenoid to control movement of the holster latch instead of an AC solenoid. FIG. 12 illustrates the locking holster 160 with the solenoid 1230, which is a DC solenoid, as part of the locking unit 164. As illustrated in FIG. 12, the locking holster inlet 162 includes the pins 1240, which include a corresponding pin for each of the contacts 515 (two power pins corresponding to the power contacts 610 and 620, a proximity detection pin corresponding to the proximity detection contact 630, a control pilot pin corresponding to the control pilot contact 650, and a ground pin corresponding to the ground contact 650). The pins 1240 mate with the contacts 515. The solenoid 1230 controls the movement of the holster latch 1220 when energized. For example, assuming the charging connector 168 is plugged and locked into the charging locking holster inlet 162, when the charging station 120 energizes the charging cord 140, power will be supplied through the power pins of the pins 1240 of the locking holster inlet 162 to the solenoid 1230 causing the holster latch 1220 to unlock the charging connector 168 (e.g., the holster latch 1220 releases allowing the charging connector 168 to be removed from the locking holster inlet 162).

Figure 13:
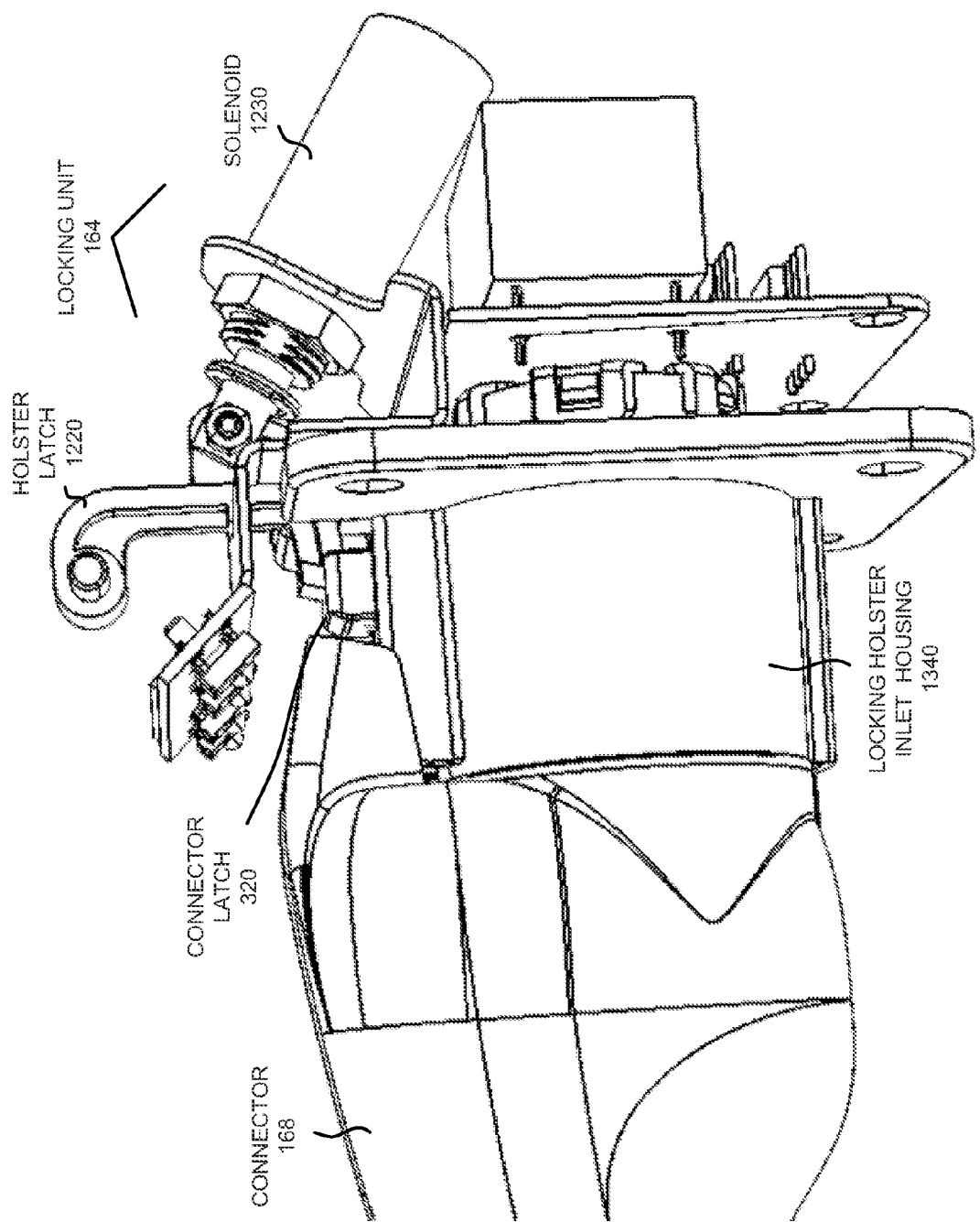
FIG. 13 illustrates the exemplary connector mated and locked with the exemplary connector locking holster inlet of FIG. 12 according to one embodiment of the invention.

FIG. 13 illustrates the exemplary connector mated and locked with the exemplary locking holster inlet of FIG. 12 according to one embodiment of the invention. As illustrated in FIG. 13, the connector latch 320 engages with the holster latch 1220 to lock the connector 168 within the locking holster 160. The contacts 515 mate with the pins 1240 (within the locking holster inlet housing 1340). The solenoid 1230, powered when the charging cord 140 is energized, controls the movement of the holster latch 1220 to unlock the connector 168 allowing it to be removed from the locking holster inlet 162.

It should be understood that certain circuits, wires, and other electronics have not been shown in detail in order not to obscure the understanding of the operation of the connector 168 and the locking holster 160. For example, circuitry for the control pilot signal has not been in detail on the connector 168 and the locking holster 160. However, in some embodiments, the circuitry for the control pilot signal of the locking holster 160 (e.g., the circuitry for the connector sensing mechanism 166) is different than that of the circuitry for the control pilot signal of the electric vehicle charging inlet 112 causing the voltage of the return path of the control pilot signal when the connector 168 is plugged in the locking holster inlet 162 to be different than the return path of the control pilot signal when the connector 168 is plugged in the electric vehicle charging inlet 112. Other circuits, wires, and/or electronics have also not been shown in detail.

Figure 14:
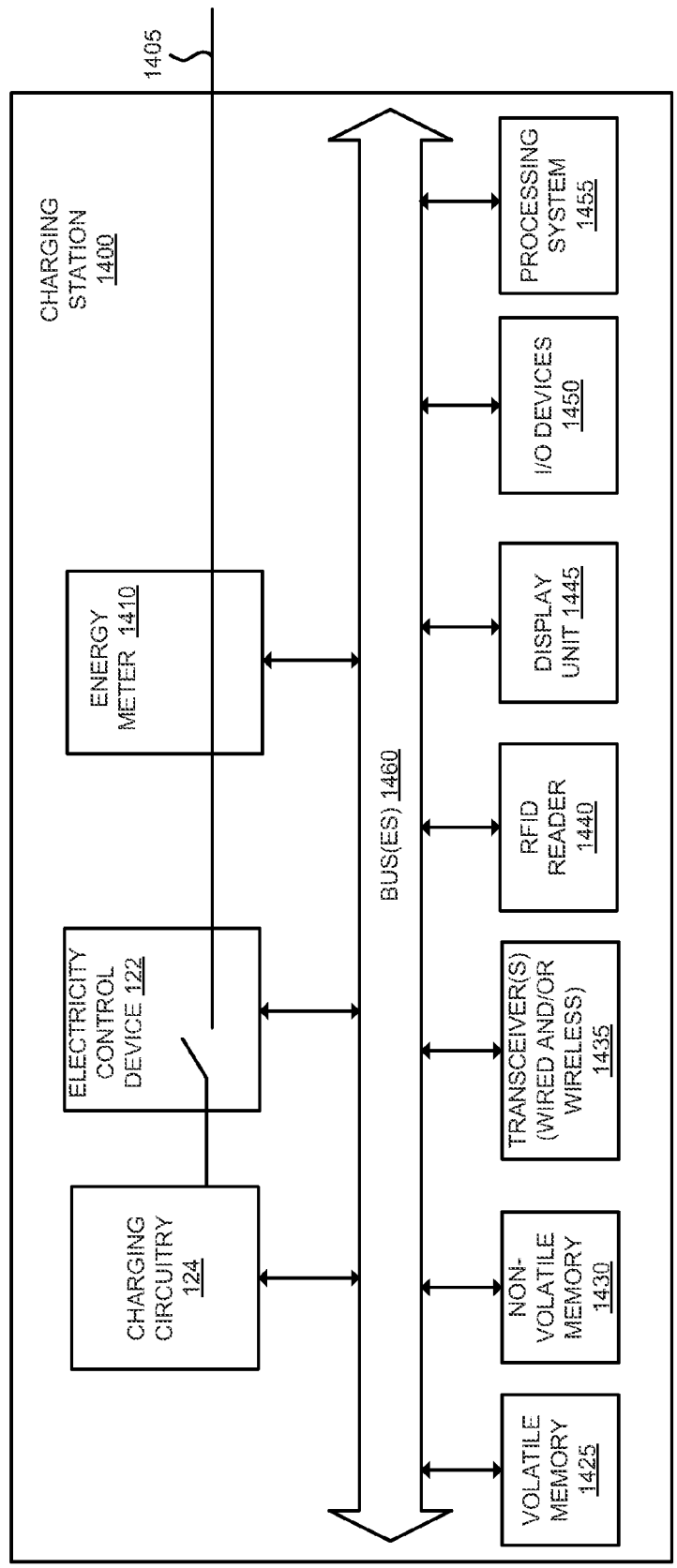
FIG. 14 illustrates an exemplary embodiment of a charging station according to one embodiment of the invention.

FIG. 14 illustrates an exemplary embodiment of a charging station according to one embodiment of the invention. It should be understood that FIG. 14 illustrates an exemplary architecture of a charging station (such as for the charging station 120), and other, different architectures may be used in embodiments of the invention described herein, which may have more or less components.

As illustrated in FIG. 14, the charging station 1400 includes the energy meter 1410, the electricity control device 122, the charging circuitry 124, the volatile memory 1425, the non-volatile memory 1430 (e.g., hard disk, optical disc, flash memory, PCM (phase change memory), etc.), one or more transceiver(s) 1435 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)), the RFID reader 1440, the display unit 144, the I/O devices 1450 (e.g., keyboard, touchscreen, or other ways to interface with the charging station), and the processing system 1455, which are coupled with one or more buses 1460. The processing system 1455 represents one or more general-purpose processing devices such as a microprocessor, central processing unit, or the like. More particularly, the processing system 1455 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 1455 may also be one or more special-purpose processing devices such as an application specific integrated circuit (ASIC) or a field programmable gate array (FPGA). In one embodiment, the processing system 1455 includes the control modules 126 and/or executes instructions stored in the volatile memory 1425 and/or non-volatile memory 1430 to generate the control modules 126.

The energy meter 1410 measures the amount of electricity that is flowing on the power line 135 through the charging circuitry 124. While in one embodiment of the invention the energy meter 1410 measures current flow, in an alternative embodiment of the invention the energy meter 1410 measures power draw. The energy meter 1410 may be an induction coil or other devices suitable for measuring electricity.

The electricity control device 122 is a solid-state device that is used to control the current flowing on the power line 135 or any other device suitable for controlling the current flowing on the power line 135. For example, in some embodiments the electricity control device 122 energizes the charging circuitry 124 (e.g., by completing the circuit to the power line 135) or de-energizes the charging circuitry 124 (e.g., by opening the circuit to the power line 135). In some embodiments the electricity control device 122 energizes the charging circuitry 124 responsive to receiving an authorized request from an electric vehicle operator.

The RFID reader 1440 reads RFID tags from RFID enabled devices (e.g., smartcards, key fobs, contactless credit cards, etc.), embedded with RFID tag(s) of operators that want to use the charging station 1400. For example, in some embodiments a vehicle operator can wave/swipe an RFID enabled device near the RFID reader 1440 to request a charging session with the charging station 1400. It should be understood, however, that charging sessions may be requested in different ways and access identifiers may be presented to the charging station in different ways. For example, in some embodiments the electric vehicles communicate an access identifier (e.g., their VIN) to the charging station through a protocol (e.g., PLC). In such embodiments, the electric vehicle operator may not be required to present an access identifier (such as the RFID enabled device) to gain access to the charging station. However, it should be understood that the electric vehicle operators may use the RFID reader 1440 for payment.

The transceiver(s) 1435 transmit and receive messages. For example, the transceiver(s) 1435 may transmit authorization requests to the server and receive authorization replies, transmit charging session data to the server for accounting, etc. The display unit 1445 is used to display messages to vehicle operators (e.g., charging status, confirmation messages, error messages, notification messages, etc.). The display unit 1445 may also display parking information if the charging station 1400 is also acting as a parking meter (e.g., amount of time remaining in minutes, parking violation, etc.). The processing system 1455 may retrieve instruction(s) from the volatile memory 1425 and/or the nonvolatile memory 1430, and execute the instructions to perform operations as described above.

Some portions of the present invention may be implemented using code and data stored and executed on the charging station. The code and/or data may be stored in machine-readable media, such as machine-readable storage media (e.g., magnetic disks; optical disks; random access memory; read only memory; flash memory devices; phase-change memory) and/or machine-readable communication media (e.g., electrical, optical, acoustical or other form of propagated signals—such as carrier waves, infrared signals, digital signals, etc.). Thus, the storage device(s) of a given charging station typically stores code and/or data for execution on a set of one or more processors of that charging station. Of course, one or more parts of an embodiment of the invention may be implemented using different combinations of software, firmware, and/or hardware.

While the locking holster has been described in relation to a single locking holster inlet receiving a single charging connector at a given time, in some embodiments the locking holster includes multiple locking holster inlets capable of locking multiple charging plugs at a given time.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus, comprising:
an electricity control device to control a supply of electricity available to flow through an electric vehicle charging cord that is attached to an electric vehicle charging station; and
an electric vehicle charging connector locking holster that is configured to,
lock a charging connector of the electric vehicle charging cord in the locking holster when the charging connector is inserted into the locking holster, and
unlock the charging connector from the locking holster in response to electricity flowing through the electric vehicle charging cord.

2. The apparatus of claim 1, wherein the electric vehicle charging connector locking holster is located remotely from the electric vehicle charging station.

3. The apparatus of claim 1, wherein the electric vehicle charging connector locking holster is attached to the electric vehicle charging station.

4. The apparatus of claim 1, wherein the charging connector remains locked in the locking holster without drawing electricity when electricity is not flowing through the electric vehicle charging cord.

5. The apparatus of claim 1, wherein the locking holster includes a connector sensing mechanism to indicate to the electric vehicle charging station that the charging connector is inserted into the locking holster.

6. The apparatus of claim 1, wherein the electricity control device is included in the electric vehicle charging station.

7. The apparatus of claim 6, wherein the electric vehicle charging station includes one or more control modules that are adapted to control operation of the electricity control device.

8. The apparatus of claim 7, wherein the one or more control modules are further adapted to determine when the charging connector has been removed from the locking holster and consequently cause the control device to stop the supply of electricity available to flow through the electric vehicle charging cord.

9. The apparatus of claim 7, wherein the one or more control modules are further adapted to perform an authorization procedure in response to receiving a request to use the electric vehicle charging station and consequently cause the control device to allow electricity to flow through the electric vehicle charging cord in response to successful authorization.

10. A method for a self powered electric vehicle charging connector locking system, wherein a charging connector of a charging cord that is attached to an electric vehicle charging station is initially locked in an electric vehicle charging connector locking holster, the method comprising:
causing the locking holster to unlock the charging connector from the locking holster by energizing the charging cord;
detecting that the charging connector has been removed from the locking holster; and
in response to the detection that the charging connector has been removed from the locking holster, de-energizing the charging cord.

11. The method of claim 10, further comprising:
detecting that the charging connector has been inserted into an electric vehicle charging inlet of an electric vehicle; and
in response to the detection that the charging connector has been inserted into the electric vehicle charging inlet, energizing the charging cord to allow the electric vehicle to be charged.

12. The method of claim 11, further comprising:
detecting that the charging connector has been removed from the electric vehicle charging inlet; and
in response to the detection that the charging connector has been removed from the electric vehicle charging inlet, de-energizing the charging cord.

13. The method of claim 10, wherein prior to energizing the charging cord to unlock the charging connector from the locking holster, performing the following operations:
receiving a request to use the charging station; and
authorizing the request.

14. The method of claim 10, wherein the charging connector is initially plugged and locked in a charging connector locking holster inlet of the locking holster, and wherein the charging connector and the charging connector locking holster inlet are SAE J1772 compliant.

15. An apparatus, comprising:
an electric vehicle charging connector locking holster that is configured to,
lock a charging connector of an electric vehicle charging cord in the locking holster when the charging connector is inserted into the locking holster, and
unlock the charging connector from the locking holster in response to electricity flowing through the electric vehicle charging cord.

16. The apparatus of claim 15, further comprising: a connector sensing mechanism adapted to indicate to an electric vehicle charging station when the charging connector is inserted into the electric vehicle charging connector locking holster.

17. The apparatus of claim 15, wherein the electric vehicle charging connector locking holster is SAE J1772 compliant.

18. The apparatus of claim 15, wherein the electric vehicle charging connector locking holster is located remotely from an electric vehicle charging station that is attached to the electric vehicle charging cord.

19. The apparatus of claim 15, wherein the electric vehicle charging connector locking holster is attached to an electric vehicle charging station that is attached to the electric vehicle charging card.

20. The apparatus of claim 15, wherein the electric vehicle charging connector locking holster is configured to lock the charging connector of the electric vehicle charging cord without drawing electricity.

* * * * *